(12) United States Patent
Kofler

(10) Patent No.: US 7,423,517 B2
(45) Date of Patent: Sep. 9, 2008

(54) TRANSPONDER WITH A CONTROLLABLE POWER-ON-RESET CIRCUIT

(75) Inventor: Robert Kofler, Graz-Kroisbach (AT)

(73) Assignee: NXP B.V., Eindhoven (NL)

( * ) Notice: Subject to any disclaimer, the term of this patent is extended or adjusted under 35 U.S.C. 154(b) by 412 days.

(21) Appl. No.: 10/522,849

(22) PCT Filed: Jul. 18, 2003

(86) PCT No.: PCT/IB03/03273

§ 371 (c)(1), (2), (4) Date: Jan. 28, 2005

(87) PCT Pub. No.: WO2004/013806

PCT Pub. Date: Feb. 12, 2004

(65) Prior Publication Data

US 2006/0164215 A1 Jul. 27, 2006

(30) Foreign Application Priority Data

Jul. 30, 2002 (EP) .................................. 02102076

(51) Int. Cl.
*H04Q 5/22* (2006.01)

(52) U.S. Cl. .............. 340/10.51; 340/10.1; 340/10.4; 340/10.5; 340/572.4; 235/492

(58) Field of Classification Search ............... 235/492; 340/10.1, 10.4, 825.69, 825.72, 10.51, 10.5, 340/572.4

See application file for complete search history.

(56) References Cited

U.S. PATENT DOCUMENTS

| | | | |
|---|---|---|---|
| 5,345,231 A * | 9/1994 | Koo et al. | 340/870.31 |
| 5,736,728 A * | 4/1998 | Matsubara | 235/492 |
| 6,650,229 B1 * | 11/2003 | Wuidart et al. | 340/10.4 |
| 6,963,270 B1 * | 11/2005 | Gallagher et al. | 340/10.2 |
| 2001/0052548 A1 | 12/2001 | Kompan et al. | |
| 2003/0162496 A1 * | 8/2003 | Liu | 455/11.1 |

FOREIGN PATENT DOCUMENTS

| | | |
|---|---|---|
| EP | 0 831 414 | 3/1998 |
| FR | 2 797 072 | 2/2001 |

* cited by examiner

Primary Examiner—Brian Zimmerman
Assistant Examiner—Vernall Brown

(57) ABSTRACT

In a transponder (1) and an integrated circuit (5), the integrated circuit (6) has a monitoring circuit (23) to which a d.c. supply voltage (VS) can be fed and by which a signalizing signal (POK) whose waveform is dependent on the relationship between the d.c. supply voltage (VS) and a voltage threshold value (VTHR1, VTHR2) can be generated, wherein the monitoring circuit (23) is arranged to be controllable in respect of the generation of the signalizing signal (POK), and wherein a control circuit (28) is provided for controlling the monitoring circuit (23) by means of at least one control signal (CS1, CS2).

19 Claims, 2 Drawing Sheets

TRANSPONDER WITH A CONTROLLABLE POWER-ON-RESET CIRCUIT

The invention relates to a transponder that is arranged for non-contacting communication with a communication station, and that has transmission means and that has an integrated circuit having circuit connecting contacts, wherein the transmission means are connected to circuit connecting contacts, wherein an input voltage can be picked off from these circuit connecting contacts, wherein the integrated circuit contains a monitoring circuit to which a voltage generated by using the input voltage can be fed and by which a signalizing signal whose waveform is dependent on the relationship between the fed voltage and a voltage threshold value can be generated, and wherein the integrated circuit contains at least one data-processing circuit to which the signalizing signal can be fed for the purpose of signalizing at least two values of the fed voltage to the data-processing circuit.

The invention further relates to an integrated circuit that is intended for use in a transponder for non-contacting communication with a communication station, which transponder is arranged in the manner detailed in the first paragraph above.

A transponder of the kind detailed in the first paragraph above and an integrated circuit of the kind detailed in the second paragraph above have been put on the market in a plurality of variant designs and are therefore known. Reference may also be made to patent document U.S. Pat. No. 5,736,728 B1 in connection with such a transponder.

In the transponder that has been put on the market, the integrated circuit is so designed that by means of the monitoring circuit being realized by a power-on-reset circuit a d.c. supply voltage for the integrated circuit that is formed by rectifying the input voltage is monitored in relation to a voltage threshold value preset at a fixed level, and a signalizing signal, namely a so-called power-on-reset signal, is generated as a function of the result of the monitoring process. This signalizing signal is essentially a signal that is at a low level if the d.c. supply voltage is lower than the voltage threshold value and that is at a high level if the d.c. supply voltage is higher than the voltage threshold value. In the known transponder, the single voltage threshold value laid down in the monitoring circuit is laid down in the light of a minimum d.c. supply voltage required for the storage means of the integrated circuit of the transponder. This minimum supply voltage required for the storage means is higher in a write mode of the transponder in which data is written to the storage means than in a read mode of the transponder in which data stored in the storage means is read out. In the known transponder, even though the difference between the two minimum supply voltages required in the write mode and the read mode is relatively small, in the known transponder the voltage threshold value defined in the monitoring circuit is laid down in the light of the higher minimum supply voltage that is required for the storage means in the write mode. Thus the level of the voltage threshold value is relatively high, which means that, to obtain a d.c. supply voltage that is above this higher voltage threshold value, a relatively high input voltage is required at the connecting contacts of the integrated circuit, which makes it necessary for there to be a relatively high level of coupling between the transmission means of the transponder and the transmission means of a communication station, which is reflected in a relatively short range of communication. This state of affairs is a disadvantage particularly in connection with the read mode, because a read mode of this kind can be carried out satisfactorily at much lower d.c. supply voltages, and hence input voltages, than the write mode, and thus at longer communication ranges too, which however is not possible in the known transponder because of the voltage threshold value that is laid down in the light of the higher minimum supply voltage required for the storage means in the write mode.

It is an object of the invention to solve the problem described above in a simple way and to provide an improved transponder and an improved integrated circuit for such a transponder.

To achieve the above object, features according to the invention are provided in a transponder according to the invention such that a transponder according to the invention can be characterized in the manner specified below, namely:

A transponder that is arranged for non-contacting communication with a communication station, and that has transmission means and that has an integrated circuit having circuit connecting contacts, wherein the transmission means are connected to circuit connecting contacts, wherein an input voltage can be picked off from these circuit connecting contacts, wherein the integrated circuit contains a monitoring circuit to which a voltage generated by using the input voltage can be fed and by which a signalizing signal whose waveform is dependent on the relationship between the fed voltage and a voltage threshold value can be generated, wherein the integrated circuit contains at least one data-processing circuit to which the signalizing signal can be fed for the purpose of signalizing at least two values of the fed voltage to the data-processing circuit, wherein the monitoring circuit is arranged to be controllable in respect of the generation of the signalizing signal, and wherein control means are provided for controlling the monitoring circuit in respect of the generation of the signalizing signal, which control means are arranged to generate at least one control signal.

To achieve the above object, features according to the invention are provided in an integrated circuit according to the invention such that an integrated circuit according to the invention can be characterized in the manner specified below, namely:

An integrated circuit that is intended for use in a transponder for non-contacting communication with a communication station, and that has circuit connecting contacts which are intended for connection to transmission means of the transponder and from which an input voltage can be picked off, which integrated circuit contains a monitoring circuit to which a voltage generated by using the input voltage can be fed, by which integrated circuit a signalizing signal whose waveform is dependent on the relationship between the fed voltage and a voltage threshold value can be generated, and which integrated circuit contains at least one data-processing circuit to which the signalizing signal can be fed for the purpose of signalizing at least two values of the fed voltage to the data-processing circuit, wherein the monitoring circuit is arranged to be controllable in respect of the generation of the signalizing signal, and wherein control means are provided for controlling the monitoring circuit in respect of the generation of the signalizing signal, which control means are arranged to generate at least one control signal.

What is achieved by the provision of the features according to the invention, in a way that is simple in terms of circuitry, is that, in a transponder according to the invention and in an integrated circuit according to the invention, the behavior of the transponder and the integrated circuit can be adjusted, in a way that is simple in terms of circuitry, to suit different circumstances or requirements or desires by controlling the monitoring circuit in respect of the generation of the signalizing signal, by means of the control means, in a manner suited to the circumstances or requirements or desires. What is also advantageously achieved in this way is that, where there are relatively large differences between the minimum d.c. supply voltages required in the write mode and read mode of a transponder, a communication range that is ideally adapted to the mode that is activated can be obtained in each of the two modes. With regard to the signalizing signal that is generated in a transponder according to the invention and in an integrated circuit according to the invention, it should also be mentioned that this signalizing signal can be used for reset purposes, to initiate a reset procedure in a microcomputer for example, but that the signalizing signal may also be used for other purposes, such as for automatically transmitting from a transponder according to the invention to a communication station information to indicate that the transponder is being supplied with an adequate amount of energy or with too little energy.

In a transponder according to the invention and in an integrated circuit according to the invention, the monitoring circuit can be arranged to be controllable in respect of the voltage that is generated by using the input voltage and that is fed to the monitoring circuit, in which case voltages of different levels that represent the input voltage are fed to the monitoring circuit, preferably by means of a voltage divider that is connected upstream of the monitoring circuit and that is controllable by means of the control means. It has however proved particularly advantageous if the features detailed in claim 2 and claim 9 respectively are provided in a transponder according to the invention and in an integrated circuit according to the invention. A design of this kind has proved particularly advantageous with regard to implementation that is as simple as possible in terms of circuitry.

It has proved particularly advantageous if, in addition, the features detailed in claim 3 and claim 10 respectively are provided in a transponder according to the invention and in an integrated circuit according to the invention. What is advantageously achieved in this way is that the behavior of the monitoring circuit is automatically laid down as a function of the mode that is activated in a transponder or in an integrated circuit.

In a transponder and in an integrated circuit of the design specified in the previous paragraph, the control means may be arranged to exert control as a function of a start mode that is automatically activated when the transponder enters the communication range of a communication station and of a TTF mode that is switched to automatically in succession, the TTF mode being the "Transponder Talks First" mode in which the transponder replies without being separately requested to do so. It has however proved particularly advantageous if, in addition, the features detailed in claim 4 and claim 11 respectively are provided in a transponder according to the invention and in an integrated circuit according to the invention. This is particularly advantageous because the read mode and the write mode are the modes that occur most often in a transponder. It is also particularly advantageous because it enables a longer communication range to be obtained when operating in the read mode than when operating in the write mode.

It has further proved particularly advantageous if, in addition, the features detailed in claim 5 and claim 12 respectively are provided in a transponder according to the invention and in an integrated circuit according to the invention. What is achieved in this way is that a change in the behavior of the monitoring circuit only ever takes place when it is ordered by a communication station by means of a command signal.

It has, however, also proved highly advantageous if the features detailed in claim 6 and claim 13 respectively are provided in a transponder according to the invention and in an integrated circuit according to the invention. A substantial advantage is achieved in this way, namely that the behavior of the monitoring circuit can be laid down both by the manufacturer of the transponder or integrated circuit and by a user of the transponder or integrated circuit, because the storage of an item of control information can be performed both by the manufacturer and by a user. A user may for example choose between two items of control information to be stored, in which case a first item of control information produces a first signalizing signal from the monitoring circuit and a second item of control information produces a second signalizing signal from the monitoring circuit, the first signalizing signal resulting in a shorter communication range and at the same time in a high reliability of communication and the second signalizing signal resulting in a longer communication range and at the same time in a less high reliability of communication.

In the arrangement detailed in the previous paragraph, it has proved particularly advantageous if, in addition, the features detailed in claim 7 and claim 14 respectively are provided. In this way a configuration register, which is provided anyway in a transponder or an integrated circuit, is also used to store an item of control information.

These and other aspects of the invention are apparent from and will be elucidated with reference to the two embodiments described hereinafter, to which the invention is not limited however.

Figure 1:
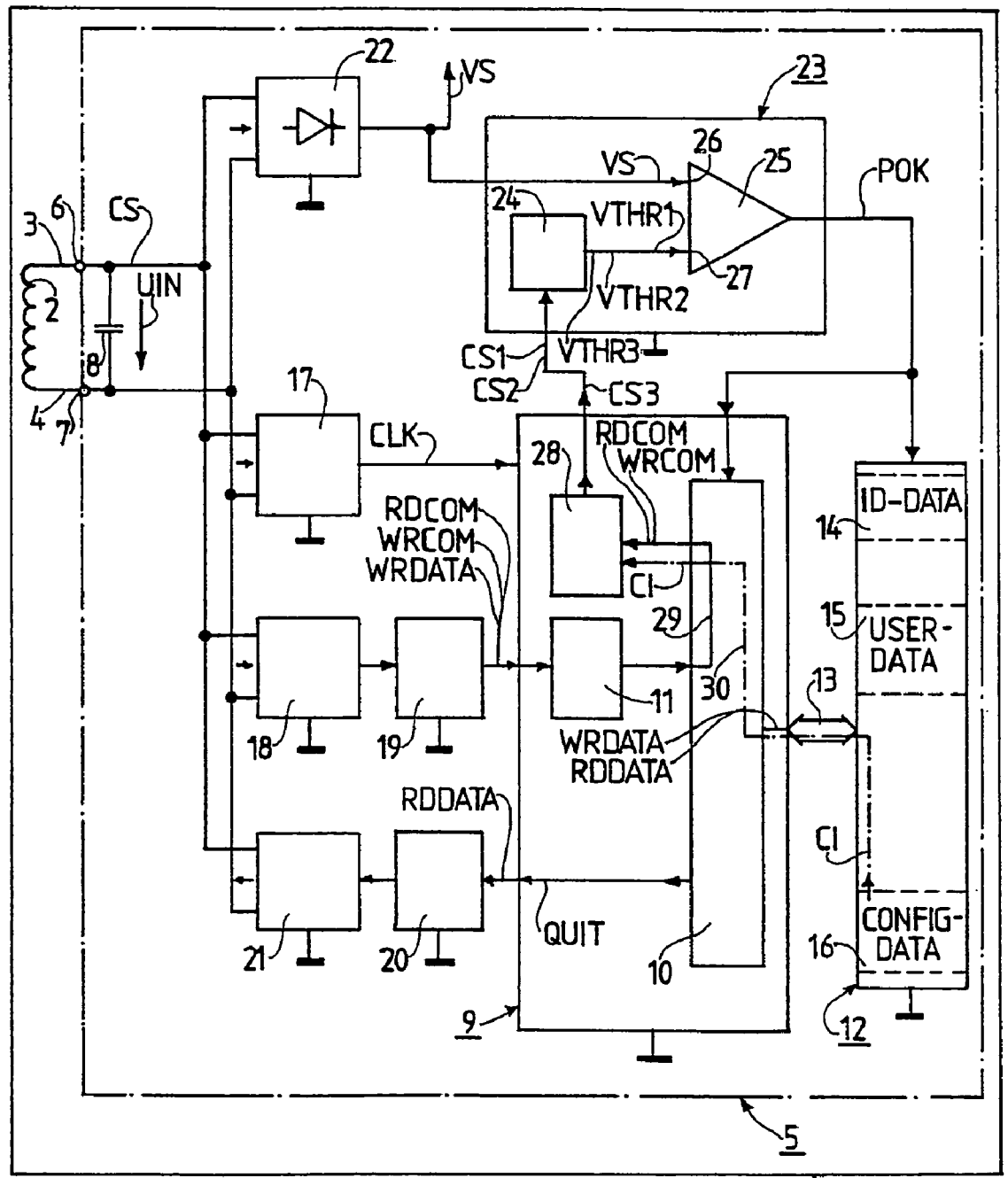
FIG. 1 is a highly diagrammatic view, in the form of a block circuit diagram, of a part of a transponder, and of an integrated circuit for such a transponder, that is essential in the present connection, according to one embodiment of the invention.

FIG. 1 shows a transponder 1. The transponder 1 is in the form of a tag or label. The transponder 1 may however also be in the form of a card-like data carrier. The transponder 1 is intended and arranged for non-contacting communication with a communication station that is not shown. For this purpose, the transponder 1 has transmission means 2 that are formed in the present case by a transmission coil 2 that can enter, in an inductive manner, i.e. in the manner employed in a transformer, into operative connection with a transmission coil of the communication station that is not shown in order to make a transmission. Transmission means that operate capacitively may be provided in place of the transmission coil 2. The transmission means may also be formed by a dipole or a monopole, particularly when the transmission takes place at very high frequencies in the MHz or GHz range. The transmission coil 2, that is to say the transmission means 2, has a first transmission-means connecting contact 3 and a second transmission-means connecting contact 4. Transmission means may also have more than two transmission-means connecting contacts.

The transponder 1 further contains an integrated circuit 5. The integrated circuit 5 has a first circuit connecting contact 6 and a second circuit connecting contact 7. Further circuit connecting contacts are not shown. The first circuit connecting contact 6 has an electrically conductive connection to the first transmission-means connecting contact 3 and the second circuit connecting contact 7 has an electrically conductive connection to the second transmission-means connecting contact 4. Because a transmission coil 2 is provided as the transmission means in the present case, there is connected to the two circuit connecting contacts 6 and 7 a capacitor 8 that is implemented in the integrated circuit 5 and that forms, with the transmission coil 4, a resonant circuit. The resonant frequency of this resonant circuit is tuned to the frequency of a carrier signal CS in the present case, but this need not necessarily be so. When the transponder 1 is in a transmitting mode, the carrier signal CS is received in an unmodulated form from the communication station (not shown) and is load-modulated by the transponder 1. When the transponder 1 is in a receiving mode, the carrier signal CS is emitted in amplitude-modulated form by the communication station (not shown). A frequency-modulated form or a phase-modulated form may also be employed rather than the amplitude-modulated form. Both in its load-modulated form and in its amplitude-modulated form and its unmodulated form, the carrier signal CS results in an input voltage UIN that can be picked off from the two circuit connecting contacts 6 and 7.

The transponder 1 and the integrated circuit 5 contain a microcomputer 9 by means of which a large number of means and functions are implemented, though of these only the ones that are essential in the present case will be gone into in detail here. The microcomputer 9 is intended in particular as a data-processing circuit 9. A hard-wired logic circuit may also be provided rather than the microcomputer 9. The microcomputer 9 contains operation-controlling means 10 to control the timing of the operations that can be performed by means of the microcomputer 9. The microcomputer 9 also contains recognition means 11 that are provided and arranged for recognizing commands and for recognizing data. A read command RDCOM, a write command WRCOM and write data WRDATA to be written to the transponder 1 and the integrated circuit 5 can be recognized by means of the recognition means 11. There are of course also a large number of other commands and types of data that can be recognized by means of the recognition means.

The transponder 1 and the integrated circuit 5 further contain storage means 12 that are connected to the microcomputer 9 via a connection 13, over which connection 13 data can be transmitted between the microcomputer 9 and the storage means 12. The storage means comprise a RAM, a ROM and an EEPROM. The storage means 12 may however also comprise other storage modules.

Stored in the storage means 12 are a large number of types of data of which the types listed below will be mentioned in the present case, namely identifying data ID-DATA, user data USER-DATA and configuration data CONFIG-DATA. The identifying data ID-DATA is stored in a storage area 14 of the storage means 12. The user data USER-DATA is stored in a storage area 15 of the storage means 12. The configuration data CONFIG-DATA is stored in a so-called configuration register 16 of the storage means 12. The identifying data ID-DATA is a serial number that is characteristic of the transponder 1 or the integrated circuit 5. The user data USER-DATA is data that has been entered in the storage means 12 by a user of the transponder 1. The configuration data CONFIG-DATA is data by means of which certain preset configurations can be automatically produced in the transponder 1 and the integrated circuit 5. The configuration data CONFIG-DATA may, for example, be data that is characteristic of a TTF mode, i.e. the "Transponder talks first" mode, and by means of which the TTF mode can automatically be switched on or activated in the transponder 1 and in the integrated circuit 5.

The transponder 1 and the integrated circuit 5 further contain a clock-signal generating circuit 17 that is connected to the two circuit connecting contacts 6 and 7 and by means of which a clock signal CLK can be regenerated from the carrier signal CS. However, rather than the clock-signal regenerating circuit 17, what may also be provided is a clock-signal generator by which a clock signal can be generated independently of a carrier signal, which is particularly advantageous when the carrier signal is a high-frequency one in the MHz or GHz range. The clock signal CLK is fed to the microcomputer 9. The clock signal CLK is also fed to other parts of the circuit but no further details of this will be given here.

The transponder 1 and the integrated circuit 5 further contain a demodulating circuit 18 that is connected to the two circuit connecting contacts 6 and 7 and that is intended to demodulate an amplitude-modulated carrier signal CS that is received by means of the transmission coil 2. Connected downstream of the demodulating circuit 18 is a decoding circuit 19 to which the output signals from the demodulating circuit 18 are fed and that looks after decoding. The decoded signals, such as the read command RDCOM, the write command WRCOM and the write data WRDATA for example, become available at the output of the decoding circuit 19. The above commands and data that are emitted by the decoding circuit 19 are fed to the microcomputer 9, i.e. to the recognition means 11.

The transponder 1 and the integrated circuit 5 further contain an encoding circuit 20 that is connected to the microcomputer 9 and to which signals can be fed for the encoding thereof. What can be fed to the encoding circuit 20 are for example signals representing responses by the transponder 1 and signals representing acknowledgements by the transponder 1. The data RDDATA read from the storage means 12 can also be fed to the encoding circuit 20. Connected downstream of the encoding circuit 20 is a modulating circuit 21 that is intended and arranged to load-modulate the unmodulated carrier signal CS to enable the data RDDATA that is read out to be transmitted in load-modulated form from the transponder 1 to the communication station (not shown).

It should also be mentioned that the data WRDATA to be written to the storage means 12 and the data RDDATA read out from the storage means 12 are transmitted over the connection 13 between the microcomputer 9 and the storage means 12 in order to be respectively stored in the storage means 12 and read out from the storage means 12.

The above-mentioned components of the circuitry of the transponder 1 and the integrated circuit 5 have to be supplied with energy. In the case of the transponder 1 and the integrated circuit 5, the supply of energy is effected by means of the carrier signal CS that is transmitted from the communication station (not shown) to the transponder 1 and the integrated circuit 5, this being the case regardless of whether the carrier signal CS is emitted by the communication station in modulated or unmodulated form. For this purpose, the transponder 1 and the integrated circuit 5 have a rectifier circuit 22 that is connected to the two circuit connecting contacts 6 and 7. The rectifier circuit 22 contains a bridge rectifier and a voltage-limiting circuit connected downstream of the bridge rectifier. There are however a large number of other variants known for the design of the rectifier circuit, but these will not be gone into in detail here. A d.c. supply voltage VS is generated by means of the rectifier circuit 22. The d.c. supply voltage VS is fed to all the parts of the circuit that need to be supplied with this d.c. supply voltage VS in order to supply them with power, although this is not shown separately in FIG. 1 in order not to unnecessarily detract from the clarity of the Figure.

Connected to the output end of the rectifier circuit 22 is a monitoring circuit 23. The essential task of the monitoring circuit 23 is to monitor whether the amount of energy that is being fed to the transponder 1 and the integrated circuit 5 by means of the carrier signal CS transmitted to the transponder 1 and the integrated circuit 5 is sufficiently large to guarantee satisfactory operation by the transponder, or in other words to ensure the satisfactory reception of commands and above all the satisfactory writing of data to the storage means 12 and the satisfactory read-out of data from the storage means 12. A voltage that is generated by using the input voltage UIN can be fed to the monitoring circuit 23 for this purpose, namely the d.c. supply voltage VS in the present case. The monitoring circuit 23 may however also have fed to it some other voltage that is generated by using the input voltage UIN.

The monitoring circuit 23 contains a reference-voltage source 24 by means of which a voltage threshold value can be generated, a process that will be considered in detail below. The monitoring circuit 23 also contains a comparator circuit 25, to a first input 26 of which the d.c. supply voltage VS can be fed and to a second input 27 of which the voltage threshold value generated by the reference-voltage source 24 can be fed. By means of the comparator circuit 25 of the monitoring circuit 23, there can be generated a signalizing signal POK whose waveform depends on the relationship between the fed voltage, i.e. the d.c. supply voltage VS, and a voltage threshold value. The signalizing signal POK is a signal that is at a low level (LOW) for as long as the d.c. supply voltage VS is lower than a voltage threshold value and that is at a high level (HIGH) for as long as the d.c. supply voltage VS is higher than a voltage threshold value, thus enabling the information that a supply providing a sufficiently large amount of energy is present to be conveyed, by means of the high level of the signalizing signal POK, to parts of the integrated circuit 5.

The signalizing signal POK can be fed in the present case both to the microcomputer 9, that forms a data-processing circuit 9, and to the storage means 12. This feeding of the signalizing signal POK to the microcomputer 9 and the storage means 12 is done for the purpose of signalizing at least two values of the d.c. supply voltage VS to the microcomputer 9 and the storage means 12, one of these two values being below a voltage threshold value and the other of the two values being above a voltage threshold value.

The design of the transponder 1 and the integrated circuit 5 is advantageously such that the monitoring circuit is arranged to be controllable in respect of the generation of the reporting signal POK. In the present case what is done for this purpose is that the monitoring circuit 23 is arranged to be controllable in respect of the voltage threshold value. For this, the reference-voltage source 24 is arranged to be controllable, thus enabling two voltage threshold values VTHR1 and VTHR2 of different amplitudes to be generated by means of the reference-voltage source 24.

To enable the reference-voltage source 24 to be controlled, and hence the monitoring circuit 23 to be controlled in respect of the generation of the signalizing signal POK, control means 28 that are implemented by means of the microcomputer 9 are provided. The control means 28 are intended to control the monitoring circuit 23 in respect of the generation of the reporting signal POK. The control means 28 are arranged to generate two control signals CS1 and CS2. In the present case the control means 28 are arranged to exert control as a function of two modes in which the transponder 1 is able to operate, i.e. as a function of a read mode and a write mode. This is done by arranging the control means 28 to generate the two control signals CS1 and CS2 as a function of the two command signals RDCOM and WRCOM that are emitted by a communication station and are received at the transponder 1 and the integrated circuit 5. The read command RDCOM and the write command WRCOM, which two commands are recognized by means of the recognition means 11, are fed to the control means 28, as is diagrammatically indicated by a connecting line 29. If it is the read command RDCOM that is fed to the control means 28, this causes the control means 28 to generate the first control signal CS1 and emit it to the reference-voltage source 24, which in turn causes the reference-voltage source 24 to generate the first voltage threshold value VTHR1 that is the lower of the two voltage threshold values VTHR1 and VTHR2. If it is the write command WRCOM that is fed to the control means 28, this causes the control means 28 to generate the second control signal CS2 and emit it to the reference-voltage source 24. This causes the reference-voltage source 24 to generate the higher, second voltage threshold value VTHR2.

The operation of the transponder 1 and the integrated circuit 5 with regard to the generation of the signalizing signal POK will be elucidated in detail below.

Figure 2:
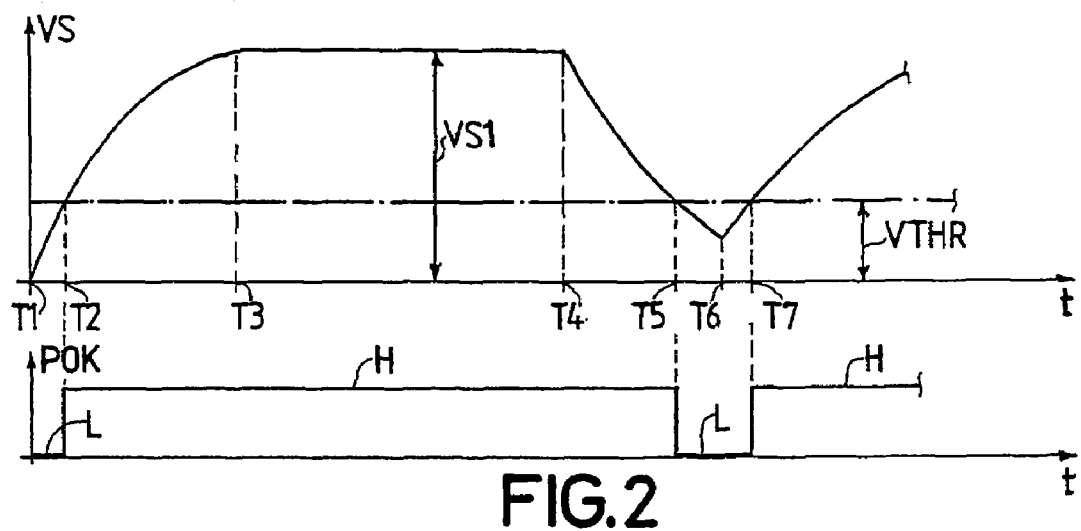
FIG. 2 shows two graphs indicating the waveforms of a d.c. supply voltage and a reporting signal in a known, prior-art transponder.

First however, the generation of a signalizing signal POK in a prior-art transponder and integrated circuit will be looked at in detail by reference to FIG. 2. The waveform of the d.c. supply voltage VS is shown in the top graph in FIG. 2 and the waveform of the signalizing signal POK in the bottom one. At time T1, the known transponder enters the communication area of a communication station and thus receives a carrier signal CS, thus causing the generation of the d.c. supply voltage VS to start in such a way that it becomes continuously higher. At time T2 the d.c. supply voltage VS that is generated exceeds the single voltage threshold value VTHR. At time T3, a voltage-limiting stage within the rectifier means for generating the d.c. supply voltage begins to act, thus causing the d.c. supply voltage VS to maintain a substantially constant value VS1 as events continue. As they do so, the known transponder leaves the communication area of the communication station, and this cause the d.c. supply voltage to begin to decline as from time T4. At time T5 the d.c. supply voltage VS drops below the voltage threshold value VTHR. At time T6 the known transponder enters the communication area of a further communication station and this causes the d.c. supply voltage to increase again. At time T7 the d.c. supply voltage VS again exceeds the voltage threshold value VTHR.

In line with the waveform that is described above for the d.c. supply voltage VS, the signalizing signal POK that is shown in the bottom graph in FIG. 2 is generated in the known transponder, this signalizing signal POK being at a low level L for as long as the d.c. supply voltage VS is below the voltage threshold value VTHR and being at a high level H for as long as the d.c. supply voltage VS is above the voltage threshold value VTHR.

The behavior of the transponder 1 and the integrated circuit 5 shown in FIG. 1 will now be elucidated in detail below by reference to FIG. 3. At time T1, the transponder 1 enters the communication area of a communication station, as a result of which the generation of the d.c. supply voltage VS begins, which d.c. supply voltage VS increases as events continue. At time T2 the d.c. supply voltage VS reaches a value that is equal to the first, lower voltage threshold value VTHR1, which first voltage threshold value VTHR1 is preset in the transponder 1 and the integrated circuit 5 and, therein, in the reference-voltage source 24 of the monitoring circuit 23. At time T2, the reporting signal POK changes from its low level L to its high level H, the microcomputer 9 and the storage means 12 being notified of this change of state and the microcomputer being set to its original state (i.e. reset). As events continue, the d.c. supply voltage V5 continues to rise until it reaches the value VS1 determined by the voltage-limiting circuit, which value it then maintains in the case postulated here. Between times T2 and T3 there is also a read-out performed of the configuration data CONFIG-DATA to allow the transponder 1 and the integrated circuit 5 to be configured. As events continue, the transponder 1 receives, between times T3 and T4, a read command RDCOM that is fed via the recognition means 11 to the operation-controlling means 10 to activate the read mode. Following the diagrammatically indicated connection 29, the read command RDCOM is also fed to the control means 28, which causes the control means 28 to generate the first control signal CS1 and to emit it to the reference-voltage source 24, which in the present case however does not have any effect in the reference-voltage source 24 because the first, lower voltage threshold value VTHR1 is already being generated anyway in the reference-voltage source 24, in line with the presetting mentioned above. As events continue, read data RDDATA to be read out of the storage means 12 is read out between times T4 and T5 and is fed via the microcomputer 9 to the encoding circuit 20 and the modulating circuit 21 for transmission to the communication station.

By way of example, it is assumed that as events continue, a write command WRCOM is transmitted between times T5 and T6 from the communication station to the transponder 1 and is received at the transponder 1. The write command WRCOM received is recognized by the recognition means 11 and is fed to the operation-controlling means 10, which causes the write mode to be activated. The write command WRCOM received is also fed to the control means 28 via the diagrammatically indicated connection 29. This causes the control means 28 now to generate the second control signal CS2 and emit it to the reference-voltage source 24. This causes the reference-voltage source 24 to be changed over at time T6 and as events continue to generate the higher, second voltage threshold value VTHR2 and to emit it to the comparator circuit 25. What is achieved in this way is that, as from time T6, it is the higher, second reference-voltage value VTHR2 that is the governing factor, which means that the d.c. supply voltage VS that is generated has to be higher than this second voltage threshold value VTHR2 to produce a signalizing signal POK at the high level H. In other words, it is ensured that, as from time T6, the storage means 12 are supplied with a d.c. supply voltage of the adequate high level needed for a write operation, which d.c. supply voltage of an adequately high level for a write operation is higher than the d.c. supply voltage required for a read operation. Following time T6, the writing of data to be written WRDATA takes place to the storage means 12 between times T6 and T7. Something else that takes place in the transponder 1 in the present case, following the writing of the data WRDATA to the storage means 12, is the generation of an acknowledgement signal QUIT, which acknowledgement signal QUIT is generated by means of the microcomputer 9 and is transmitted via the encoding circuit 20 and the modulating circuit 21 to the communication station 1.

Because it is known in the microcomputer 9 of the transponder 1 and of the integrated circuit 5 how much time it takes to write data WRDATA to the storage means 12 and to generate the acknowledgement signal QUIT, once this time has elapsed and while allowing an additional safety interval, the microcomputer 9 automatically ensures, by means of the control means 28, that at time T7 the control means 28 generate the first control signal CS1 and emit it to the reference-voltage source 24. This causes the reference-voltage source 24 to again generate the first, lower voltage threshold value VTHR1 and emit it to the comparator circuit 25, as from time T7.

Figure 3:
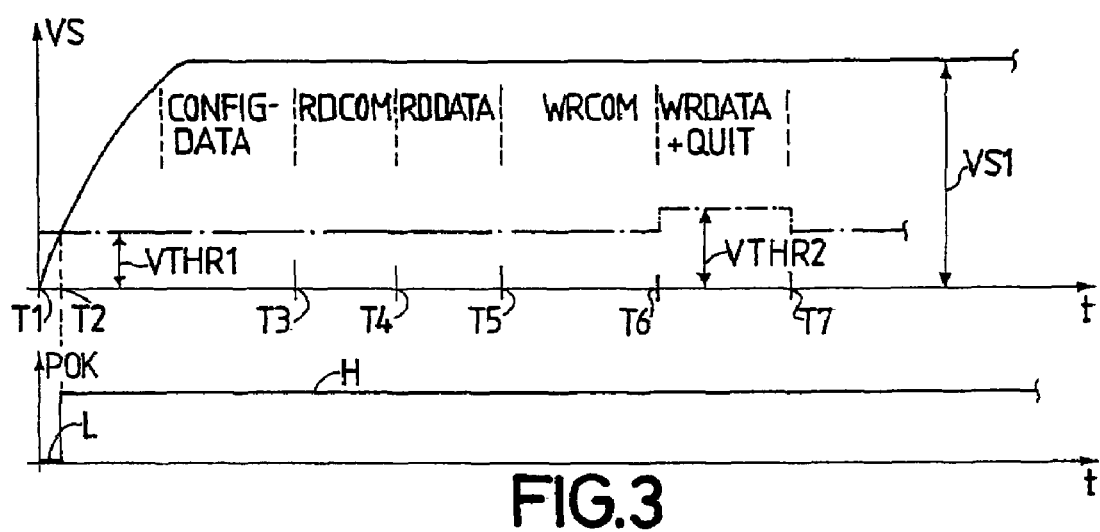
FIG. 3 shows two graphs indicating the waveforms of a d.c. supply voltage and a reporting signal in a transponder according to a first embodiment of the invention.

It is not essential for the changeover to the first, lower voltage threshold value VTHR1 to take place automatically and it could also take place as a result of a read command RDCOM being transmitted from the communication station to the transponder 1 after time T7 and between two times TX and TY which are not shown in FIG. 3. The read command RDCOM received is recognized by the recognition means 11 and fed to the operation-controlling means 10, which results in the read mode being activated. The read command RDCOM received is also fed, via the diagrammatically indicated connection 29, to the control means 28. This causes the control means 28 now to generate the first control signal CS1 and to emit it to the reference-voltage source 24. This causes the reference-voltage source 24 to be changed over at time TY and, as events continue, to generate the first, lower voltage threshold value VTHR1 and emit it to the comparator circuit 25. What is achieved in this way is that, as from time TY, it is the lower, first reference-voltage value VTHR1 that is the governing factor, which means that the d.c. supply voltage VS that is generated has to be higher than this first voltage threshold value VTHR1 to produce a signalizing signal POK at the high level H. In other words, it is ensured that, as from time TY, the storage means 12 are supplied with a d.c. supply voltage of the adequate high level needed for a read operation, which d.c. supply voltage of an adequately high level for a read operation is lower than the d.c. supply voltage required for a write operation. Following time TY, the read-out of read RDDATA to be read out takes place from the storage means 12 between time TY and a further time TZ.

As can be seen from FIG. 3, it is assumed in the example described that, after rising, the d.c. supply voltage VS remains at a consistently high level VS1 that is above both the lower, first voltage threshold value VTHR1 and the higher, second voltage threshold value VTHR2. This of course need not always be the case because there are various circumstances, principally the movement of a transponder out of the communication area of a communication station, that may result in a decline in the d.c. supply voltage VS. However, in the event of a decline in the d.c. supply voltage VS, it is ensured in the transponder 1 and the integrated circuit 5 shown in FIG. 1 that there is a guarantee of supply with more energy in the write mode that in the read mode. What is achieved, advantageously, by the change-over between the two voltage threshold values VTHR1 and VTHR2 is that in the read mode, which requires less energy, a longer range of communication is ensured than in the write mode, which is an advantage in many applications.

It should also be mentioned that, when compared with a known transponder, it is the higher, second voltage threshold value VTHR2 in the transponder 1 shown in FIG. 1 that corresponds to the single voltage threshold value VTHR in the known transponder. As can be seen from FIG. 3, the higher voltage threshold value VTHR2 is required for only a relatively short period of time (between times T6 and T7), namely substantially during the performance of a write operation, whereas during the rest of the time it is only the lower, first voltage threshold value VTHR1 that is required, which means that a longer range of communication is ensured during this remaining period.

In a variant of the transponder 1 shown in FIG. 1 and the integrated circuit 5 shown in FIG. 1, which variant is not shown separately however, the control means 28 are arranged to generate a control signal CS3 as a function of an item of control information CI that is stored in the storage means 12 of the integrated circuit 5, this item of control information CI being stored in the configuration register 14 of the storage means 12 of the integrated circuit 5. The item of control information CI is an item of information that is contained in the configuration data CONFIG-DATA and that notifies the microcomputer 9 that the transponder 1 or the integrated circuit 5 has to be operated in a "Transponder Talks First" mode. The item of control information CI can be fed to the control means 28 via the connection that is indicated in FIG. 1 by a dotted and dashed line 30. On receipt of the item of control information CI, the control means 28 generate a third control signal CS3 that is fed to the reference-voltage source 24. This causes the reference-voltage source 24 to generate a third voltage threshold value VTHR3 on receipt of the third control signal CS3 and to emit it to the comparator circuit 25.

Figure 4:
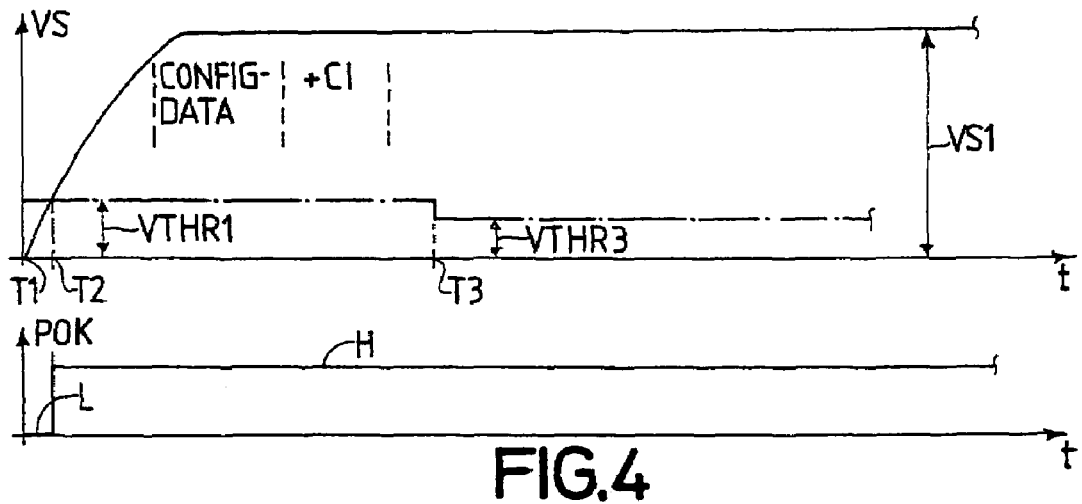
FIG. 4 shows two graphs indicating the waveforms of a d.c. supply voltage and a reporting signal in a transponder according to a second embodiment of the invention.

The way in which the variant of the transponder 1 shown in FIG. 1 that is described above operates will be elucidated below by reference to FIG. 4. As can be seen from FIG. 4, the transponder enters the communication area of a communication station at time T1. At time T2, the d.c. supply voltage VS exceeds the first voltage threshold value VTHR1, which is preset in this case too. As events continue, the configuration data CONFIG-DATA is read out, and hence so too is the item of control information CI contained in the configuration data CONFIG-DATA, between time T2 and T3. The item of control information CI that is read out is fed via the connection 30 to the control means 28, which causes the control means 28 to generate the third control signal CS3 and to emit it to the reference-voltage source 24. This causes the reference-voltage source 24 to generate the third voltage threshold value VTHR3, which is lower than the first voltage threshold value VTHR1, at time T3. As events continue, read data RDDATA is read out from the storage means 12 while the "Transponder Talks First" mode is in the switched-on state, and is processed by means of the microcomputer 9 and transmitted to the communication station via the encoding circuit 20 and the modulating circuit 21.

In the case of the variant of the transponder 1 that is elucidated above, the first voltage threshold value VTHR1 for the read mode is automatically activated when the d.c. supply voltage VS rises. Only after the configuration data CONFIG-DATA has been read out is the voltage threshold value set to the lower, third voltage threshold value VTHR3 as a function of the control information CI, as a result of the "Transponder Talks First" mode being activated. The first voltage threshold value VTHR1 for the read mode is selected in such a way as to ensure reliable read-out of the configuration data CONFIG-DATA. In the "Transponder Talks First" mode the voltage threshold value is reduced, but only to a value such that there is only low probability of reading errors occurring. Because there is little probability of reading errors of this kind, only a few of the items of data RDDATA read out in the "Transponder Talks First" mode will be affected by errors, but even this will not cause any serious problems because reading errors of this kind can easily be detected by a communication station, by means of a CRC procedure for example.

The invention claimed is:

1. An integrated circuit for use in a transponder for non-contacting communication with a communication station, the integrated circuit comprising:
   circuit connecting contacts connected to transmission means of the transponder to pick off an input voltage;
   control means to generate a control signal as a function of an operating mode of the transponder, wherein the control means is configured to generate:
      a first control signal as a function of a read mode of the transponder;
      a second control signal as a function of a write mode of the transponder; and
      a third control signal as a function of a transponder-talks-first mode of the transponder;
   a monitoring circuit to receive the control signal from the control means and a voltage based on the input voltage, the monitoring circuit to generate a signalizing signal based on a relationship between a voltage threshold value and the voltage, wherein the voltage threshold value corresponds to the control signal, the voltage threshold value comprising one of a plurality of preset voltage threshold values, the plurality of preset voltage threshold values comprising:
      a first voltage threshold value corresponding to the read mode of the transponder;
      a second voltage threshold value corresponding to the write mode of the transponder, wherein the second voltage threshold value is higher than the first voltage threshold value; and
      a third voltage threshold value corresponding to the transponder-talks-first mode of the transponder, wherein the third voltage threshold value is lower than the first voltage threshold value; and
   a data-processing circuit to receive the signalizing signal from the monitoring circuit.

2. The integrated circuit of claim 1, further comprising a rectifier to receive the input voltage from the circuit connecting contacts and to generate the voltage based on the input voltage.

3. The integrated circuit of claim 1, wherein the monitoring circuit comprises a comparator to compare the voltage threshold value and the voltage.

4. The integrated circuit of claim 3, wherein the monitoring circuit further comprises a reference-voltage source to receive the control signal from the control means and to generate the voltage threshold value based on the control signal.

5. The integrated circuit of claim 4, wherein the data-processing circuit comprises recognition means to recognize the read, write, and transponder-talks-first modes of the transponder.

6. The integrated circuit of claim 5, wherein the control means is further configured to generate the first control signal based on recognition of a read command by the recognition means.

7. The integrated circuit of claim 6, wherein the reference-voltage source is further configured to generate the first voltage threshold value from the plurality of preset voltage threshold values based on the first control signal.

8. The integrated circuit of claim 5, wherein the control means is further configured to generate the second control signal based on recognition of a write command by the recognition means.

9. The integrated circuit of claim 8, wherein the reference-voltage source is further configured to generate the second voltage threshold value from the plurality of preset voltage threshold values based on the second control signal.

10. The integrated circuit of claim 4, further comprising a configuration register of a storage means, the configuration register to store control information, wherein the control means is further configured to generate the third control signal based on the control information stored in the configuration register.

11. The integrated circuit of claim 10, wherein the configuration data corresponds to the transponder-talks-first mode of the transponder.

12. The integrated circuit of claim 1, wherein the data-processing circuit comprises a microprocessor, the microprocessor configured to initiate a reset procedure in the microprocessor based on the signalizing signal from the monitoring circuit.

13. A transponder for non-contacting communication with a communication station, the transponder comprising:
- transmission means to receive a control signal from the communication station; and
- an integrated circuit comprising:
  - circuit connecting contacts connected to the transmission means to pick off an input voltage;
  - control means to generate a control signal as a function of an operating mode of the transponder, wherein the control means is configured to generate:
    - a first control signal as a function of a read mode of the transponder;
    - a second control signal as a function of a write mode of the transponder; and
    - a third control signal as a function of a transponder-talks-first mode of the transponder;
  - a monitoring circuit to receive the control signal from the control means and a voltage based on the input voltage, the monitoring circuit to generate a signalizing signal based on a relationship between a voltage threshold value and the voltage, wherein the voltage threshold value corresponds to the control signal, the voltage threshold value comprising one of a plurality of preset voltage threshold values, the plurality of preset voltage threshold values comprising:
    - a first voltage threshold value corresponding to the read mode of the transponder;
    - a second voltage threshold value corresponding to the write mode of the transponder, wherein the second voltage threshold value is higher than the first voltage threshold value; and
    - a third voltage threshold value corresponding to the transponder-talks-first mode of the transponder, wherein the third voltage threshold value is lower than the first voltage threshold value; and
  - a data-processing circuit to receive the signalizing signal from the monitoring circuit.

14. The integrated circuit of claim 13, further comprising a rectifier to receive the input voltage from the circuit connecting contacts and to generate the voltage based on the input voltage.

15. The integrated circuit of claim 13, wherein the monitoring circuit comprises:
- a comparator to compare the voltage threshold value and the voltage; and
- a reference-voltage source to receive the control signal from the control means and to generate the voltage threshold value based on the control signal.

16. The integrated circuit of claim 15, wherein the data-processing circuit comprises recognition means to recognize the read, write, and transponder-talks-first modes of the transponder.

17. The integrated circuit of claim 16, wherein:
- the control means is further configured to generate the first control signal based on recognition of a read command by the recognition means; and
- the reference-voltage source is further configured to generate the first voltage threshold value from the plurality of preset voltage threshold values based on the first control signal.

18. The integrated circuit of claim 16, wherein:
- the control means is further configured to generate the second control signal based on recognition of a write command by the recognition means; and
- the reference-voltage source is farther configured to generate the second voltage threshold value from the plurality of preset voltage threshold values based on the second control signal.

19. The integrated circuit of claim 13, further comprising a configuration register of a storage means, the configuration register to store control information which corresponds to the transponder-talks-first mode of the transponder, wherein the control means is farther configured to generate the third control signal based on the control information stored in the configuration register.

* * * * *